Dec. 15, 1931.   J. L. DRAKE   1,836,365
SHEET GLASS CUTTING APPARATUS
Filed Aug. 26, 1927   3 Sheets-Sheet 3

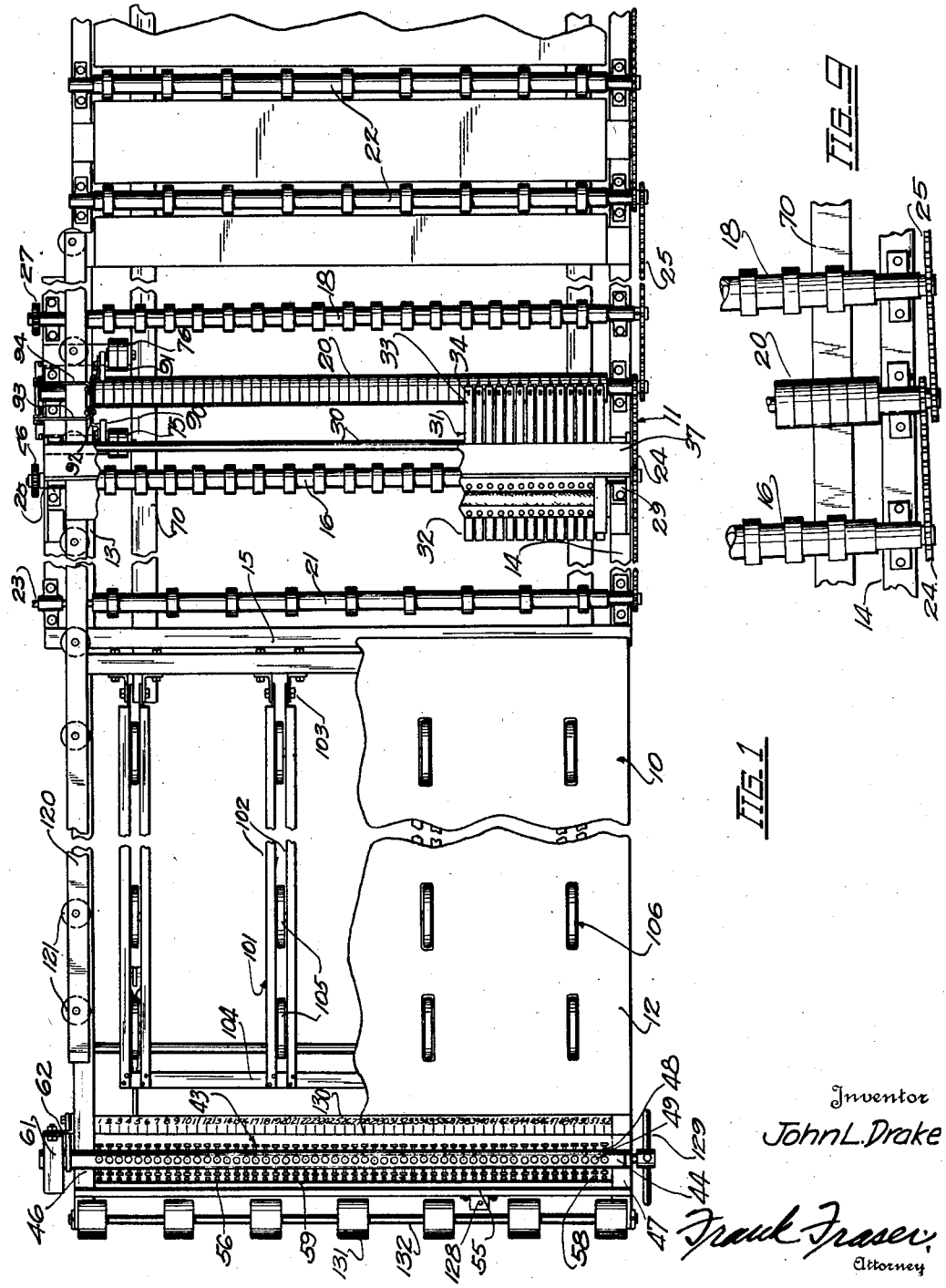

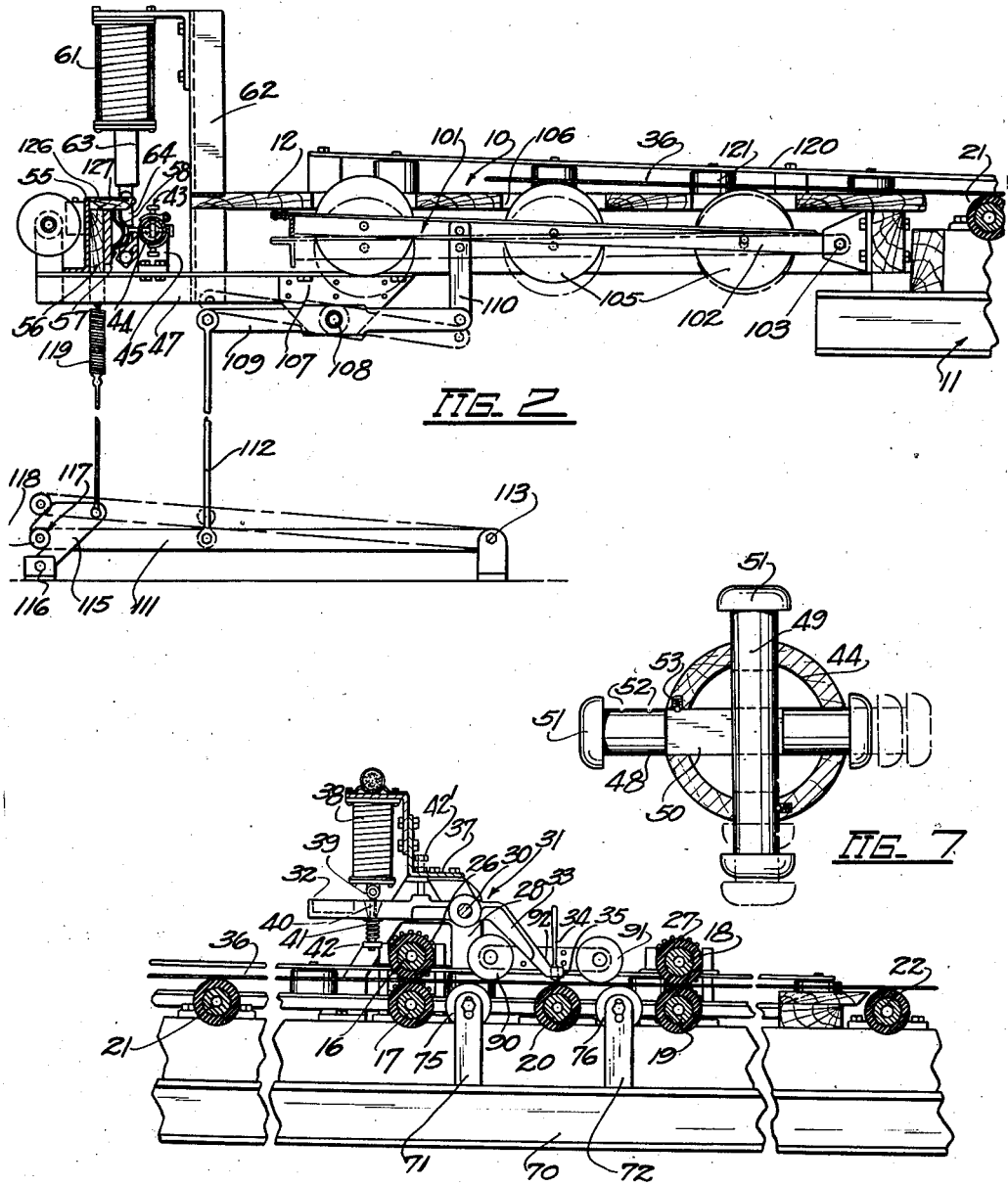

Inventor
John L. Drake
By Frank Fraser
Attorney

Patented Dec. 15, 1931

1,836,365

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

SHEET GLASS CUTTING APPARATUS

Application filed August 26, 1927. Serial No. 215,538.

The present invention relates broadly to the art of working glass and more particularly to an improved apparatus for effecting the cutting of glass sheets.

This invention is primarily designed to do away with the operation of hand-cutting as now carried out and wherein it is customary for an operator to place a sheet of glass on a cutting table and by individual cutting strokes effect the subdivision into pieces of maximum size having regard to the shape of the glass and the defects therein. This hand cutting is not only very expensive, demanding highly skilled labor, but also gives a relatively large percentage of breakage and waste from imperfect cutting or accidental moving of the gage. The present invention is designed to overcome these difficulties and to greatly reduce the cost.

An important object of the present invention is to provide improved glass cutting apparatus of simple design and easy adjustment which will render it possible for a relatively unskilled operator to cut sheets of glass rapidly and accurately.

Another object of the invention is to provide in glass cutting apparatus, means for simultaneously cutting a sheet of glass into a plurality of relatively smaller pieces.

Another object of the invention is to accomplish the cutting of the sheet by means of a plurality of individually mounted cutters independently movable at all times, the apparatus including means for carrying the sheet to be cut beneath said cutters and in contact therewith.

Another object of the invention is to provide in glass cutting apparatus including a plurality of individually mounted, independently movable cutters, means operable upon movement of the sheet to be cut for controlling the movement of the cutters into and out of cutting position.

Another object of the invention is the provision of glass cutting apparatus of this nature wherein means of a novel and improved construction is arranged at a point remote from the cutters for individually and selectively controlling the same, the operation of said cutter controlling means being preferably effected by movement of the sheet to be cut.

A further object of the invention is to provide glass cutting apparatus wherein those cutters which have been previously moved to engage the glass will be simultaneously and automatically lifted out of contact with said glass at the completion of the cutting operation.

A further object of the invention is to provide improved glass cutting apparatus embodying an arrangement which will adapt itself to glass sheets of varying thicknesses and also to glass which may not be perfectly flat.

A still further object of the invention is to provide in glass cutting apparatus of the above character, means whereby each successive sheet can be cut differently or whereby the same cut or cuts can be repeated as desired to the end that a subsequent sheet or a plurality of sheets may be cut in the same manner as an initial sheet.

Still another object of the invention is to provide improved means for supporting the sheet and carrying it beneath the cutters to effect the scoring thereof, the apparatus also including novel means for feeding the glass to said cutters.

The present invention further consists of various other novel and important features of construction and operation all of which will be more clearly hereinafter apparent when taken in connection with the accompanying drawings.

In the drawings forming a part of this application and wherein like numerals are employed to designate like parts throughout the same, Fig. 1 is a top plan view, partially broken away, of improved sheet glass cutting apparatus constructed in accordance with the present invention.

Fig. 2 is a side elevation of the forward end of the apparatus.

Fig. 3 is a longitudinal vertical section through the cutting table.

Fig. 7 is an enlarged transverse section through the keyboard.

Fig. 9 is a detail view showing the manner in which the cutting table rolls are preferably arranged, the angle of the roll as shown being somewhat exaggerated for the purpose of illustration.

Figure 4:
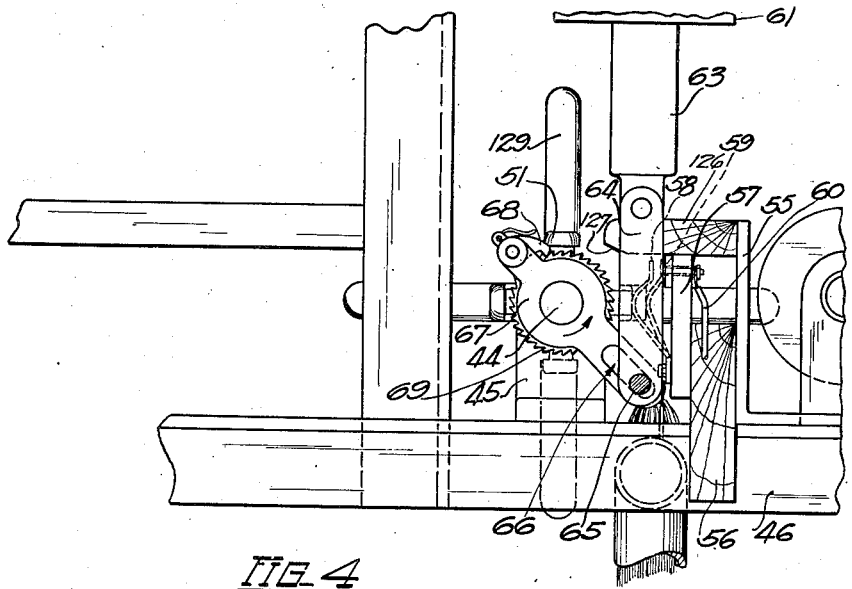
Fig. 4 is a side elevation of the keyboard arrangement and its controlling mechanism.
Figures 5, 6:
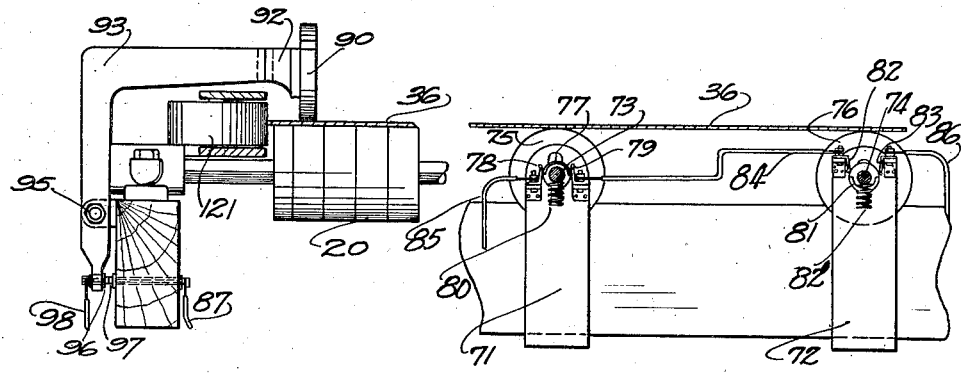
Fig. 5 is an enlarged detail view of the means for making and breaking the keyboard control circuit.
Fig. 6 is a transverse section through a portion of the cutting table showing the means of making and breaking the cutter control circuit.

In the accompanying drawings the numeral 10 designates in its entirety the sheet receiving table upon which is adapted to be laid the sheet of glass to be cut and 11 the sheet cutting and delivering table, for receiving the sheet from table 10 and supporting the same during the cutting operation after which it may be conveyed to any suitable point.

The receiving table 10 consists of an open and preferably substantially rectangular framework upon which is carried the substantially solid top 12. The cutting and delivering table 11 also consists of an open framework composed of the longitudinally extending side members 13 and 14, said members being of any desired length dependent upon the length of cutting and delivering table preferred and being suitably braced at their opposite ends by connecting cross members 15 and also by intermediate cross members, if desired.

Extending between and journaled in bearings carried by the side members 13 and 14 of the feeding table 11 are two pairs of sheet feeding rolls 16, 17 and 18, 19 the rolls of each pair being superimposed and being arranged relative to one another so as to grip the sheet therebetween and carry the same beneath the cutters. Positioned between the two pairs of sheet carrying rolls is a sheet supporting roll 20 while arranged forwardly of the feeding rolls 16, 17 is one or any suitable number of sheet feeding rolls 21. A plurality of delivering rolls 22 may be provided at the opposite side of the sheet feeding rolls 18, 19 for receiving the glass after it has been cut and conveying it to any suitable point.

The various rolls described hereinabove which rolls comprise the cutting and delivering table are adapted to be positively driven in a manner now to be described. The power for driving these rolls may be initially applied from a suitable source to one end of the roll 21 as indicated at 23 and may then be transmitted to the other rolls through a series of chain and sprocket and gear connections. To this end, there may be carried by the opposite end of roll 21 a suitable sprocket. Similar sprockets may also be carried by the corresponding ends of the rolls 17 and 20. Trained about these sprockets is a sprocket chain 24 and a similar sprocket chain 25 may be trained about sprockets carried by the rolls 19, 20 and the adjacent roll 22 so that these rolls will be driven from and in unison with the first mentioned rolls. Power can then be transmitted to the remaining delivering rolls 22 in the same manner if desired. The upper sheet feeding rolls 16 and 18 are adapted to be driven from the lower rolls 17 and 19 through intermeshing gear 26 and 27. The various rolls are preferably driven at the same speed synchronously although they may be rotated at different speeds if preferred.

Carried by the side members 13 and 14 of the cutting table 11 are the oppositely disposed upstanding brackets 28 and 29 to which is secured a transeverse shaft 30 extending the entire width of the cutting table. This shaft, which is positioned at a suitable distance above the cutting table, has mounted thereon a plurality of cutters preferably though not necessarily spaced about one inch apart across the cutting table.

Each cutter assembly as most clearly shown in Fig. 3 comprises a lever or arm 31 pivotally mounted intermediate its ends upon the shaft 30, the rear end portion 32 of said lever being normally maintained in a substantially horizontal plane when the cutter is in engagement with the glass while the forward end portion thereof is curved downwardly as at 33 and carries at its lower end the cutting tool 34 which may be of any conventional or preferred construction and which may carry either a cutting wheel or a cutting diamond 35 adapted to score the sheet 36 as the said sheet is passed therebeneath and in contact therewith. Also secured to and extending between the brackets 28 and 29 is a supporting beam 37 carrying a plurality of electromagnets 38, one being provided for each of the cutters so that the said cutters may be independently and selectively actuated thereby.

The electromagnets 38 are preferably of the solenoid type, each including a reciprocating plunger 39 arranged in a vertical depending position as shown and to the lower end of which is pivoted a rod 40, said rod extending downwardly through an opening in the horizontal end portion 32 of the corresponding lever 31. Surrounding this rod is a compression spring 41 bearing at its lower end against a nut or the like 42 and at its upper end against the said lever so as to normally urge the same about its pivot point 30.

Upon energization of any one of the electro-magnets 38, the plunger 39 thereof will be drawn upwardly so as to rock its respective lever about the shaft 30 to lower or move the cutter 34 carried thereby into operative or cutting position. Upon de-energization of the electromagnet, the plunger will be released and the weight of the end portion 32 of lever 31 will be sufficient to cause said lever to rock about its pivot in the opposite direction to raise or return the cutter to an inoperative or non-cutting position. The compression spring 41 is provided to yieldably urge and maintain the cutter in contact with the sheet of glass being cut so as to permit the cutting of various thicknesses of sheet and to further maintain an even and constant pressure of the cutting tool upon the glass to uniformly score the same. Also, to compensate for any irregularities in the suface thereof should the sheet not be perfectly flat. In other words, the lever 31 is permitted a limited and variable amount of rocking movement. An adjusting screw 42' may be provided for engaging the lever 31 to control the degree of rocking movement thereof.

The present invention further proposes the provision of means whereby the cutters hereinabove described may be independently and selectively controlled by the operator from the forward end of the machine so that the desired cut or cuts may be easily and quickly made. To accomplish this, there is provided a keyboard arrangement designated in its entirety by the numeral 43 and comprising more specifically a hollow rotatable shaft 44 extending transversely the entire width of the table 10 and journaled at its opposite ends in bearings 45 (Fig. 2) carried by horizontal extensions 46 and 47 secured to and projecting forwardly from the receiving table 10.

The hollow shaft 44 carries a pair of keys 48 and 49 for each of the cutters, the keys of each pair extending diametrically through said shaft at right-angles to one another as clearly illustrated in Fig. 7 with their adjacent faces 50 being flat and in sliding contact with one another. Each key is also preferably provided at its opposite ends with finger pieces 51. The keys 48 and 49 are adapted for sliding movement in two opposite directions, each being provided with a plurality, preferably three notches 52 engageable by a spring pressed ball 53 or any other suitable locking means. The three notches are provided in order that each key may be moved to assume three different positions and the locking means 53 is provided in order to maintain the key in such positions. In other words, when the locking means 53 is engaged in the middle notch 52, the key is in an inoperative position from which it can be moved in either direction to assume an operative position and when in such position, the said locking means is engaged in either the inner or outer notch as will be more clearly apparent as the description proceeds.

Also carried by the extensions 46 and 47 is a cross member 55 faced with a suitable wooden or insulating block 56 carrying a bus bar 57 to which are secured a plurality of movable spring contacts 58, adapted to be moved into and out of engagement with stationary contacts 59 (Fig. 4) also carried by said bus bar 57. A pair of these contacts, associated with each pair of keys, is provided for each cutter and is arranged in series with its respective electromagnet 38, being connected thereto by means of a wire 60 leading from the stationary contact 59. The spring contacts 58 are adapted to be moved to engage the stationary contacts 59 by means of the keys 48 or 49 upon rotation of the keyboard 43. It is to be understood, however, that the keys will not make the contacts unless they have first been moved by the operator into operative position, and this is accomplished by pressing those keys which are in a vertical position downwardly so that the locking means 53 will engage the outermost or innermost notches.

In order to make the contacts 58 and 59, means is provided whereby the keyboard 43 may be periodically rotated a quarter of a turn in order that those keys which have been previously moved into operative position will engage their respective movable contacts and force them into engagement with the stationary contacts. The rotation of the keyboard is preferably controlled by a magnetic circuit including an electromagnet 61 carried by a standard 62, said magnet being also preferably of the solenoid type and having a vertically reciprocating plunger 63 to the lower end of which is secured a link 64 carrying a pin or the like 65 operating in a slot 66 in member 67. The member 67 is loosely mounted upon the shaft 44 and carries a spring pressed pawl 68 adapted to engage the teeth of the ratchet 69 which is fixed to said shaft. Thus, when the electromagnet 61 is energized, the plunger 63 thereof will be drawn upwardly to rotate the member 67 and upon such rotation, the pawl 68 engaging the teeth of rachet 69 will effect rotation of the shaft 44 a quarter of a turn. When this is done, those keys which have been previously moved downwardly into an operative position will force their respective spring contacts 58 into engagement with the corresponding stationary contacts 59.

In accordance with the present invention, the energizing and de-energizing of the electromagnet 61 or, in other words, the making and breaking of the magnetic circuit therethrough is controlled by the movement of the sheet to be cut. Accordingly, there is preferably arranged beneath the cutting table 11 an auxiliary frame or suitable supporting means 70 carrying spaced standards or uprights 71 and 72 arranged at opposite sides of the supporting roll 20, said standards being provided with vertical slots within which are slidably received shafts 73 and 74 carrying rolls 75 and 76 respectively.

The shaft 73 carries a movable contact 77 adapted to engage stationary contacts 78 and 79, the movable contact being normally held out of engagement with said stationary contacts by means of a spring 80 which tends to urge the roll 75 upwardly. The adjacent shaft 74 carries a corresponding movable contact 81 adapted to engage stationary contacts 82 and 83 but in this instance, the movable contact 81 is oppositely arranged from the movable contact 77 so that by action of the compression spring 82', the said movable contact 81 is urged to normally engage the stationary contacts 82 and 83. Thus, the switch composed of the contacts 77, 78 and 79 is normally open, while the switch composed of the contacts 81, 82 and 83 is normally closed.

To complete the circuit through the electromagnet 61, the contacts 79 and 82 are connected by a wire 84 while a wire 85 leading from the contact 78 is connected to the said electromagnet 61. A wire 86 runs from the contact 83 to the positive main 87, while a wire 88 leading from the electromagnet 61 is connected with the negative main 89, this main being also connected to the bus bar 57.

In the operation of the invention as thus far described, the sheet of glass 36 to be cut is first laid upon the receiving table 10 and is there inspected by the machine attendant to determine along what line or lines it should be cut to give the desired sizes and to avoid any defects therein. The attendant then moves the desired key or keys into operative position according to the cut or cuts to be made, this being accomplished, as stated above, by pressing downwardly on either the keys 48 or 49 which may happen to be in a vertical position. The sheet is then passed onto the cutting table where it is gripped by and between the pairs of rolls 16, 17 and 18, 19 and carried along beneath the cutters 34. When the sheet strikes the roll 75 it will depress or move the same downwardly so that the movable contact 77 will engage the stationary contacts 78 and 79 whereby to complete the circuit through the electromagnet 61 to energize the same. Upon energization of the said magnet, the plunger 63 thereof will be drawn upwardly so as to cause the keyboard 43 to be rotated in a clockwise direction a quarter of a turn in a manner and by the mechanism described above.

Upon rotation of the said keyboard, those keys which have been previously moved into operative position will engage the corresponding movable contacts 58 and urge them into engagement with their respective stationary contacts 59. As soon as the sheet strikes the roll 76 the same will be depressed so as to disengage the movable contact 81 from the stationary contacts 82 and 83 whereupon the circuit through the magnet 61 will be broken and the plunger 63 thereof will then again move downwardly to rotate the member 67 in the opposite direction on shaft 64 so that the mechanism will be reset, the pawl riding freely over the teeth of ratchet 69.

However, the making of the contacts 58 and 59 does not close the circuit through the electromagnets 38 which control the movement of the cutters, this being also accomplished by movement of the sheet through the machine. To this end, there is arranged above the sheet 36 a pair of rolls 90 and 91 disposed at opposite sides of the cutters slightly inwardly of the rolls 75 and 76. These rolls 90 and 91 are arranged at the opposite ends of a plate 92 carried by a pair of angle levers or supports 93 and 94 each being pivotally mounted to the table as at 95. Secured to the lower end of one of said arms is a movable contact 96 engagable with a stationary contact 97 carried by the cutting table 11.

A wire 98 leading from the movable contact 96 is secured to a bus bar 99 and leading from said bus bar are a plurality of wires 100 connected with the various electromagnets 38. After the sheet 36 engaging the roll 75 has effected the closing of the circuit through the magnet 61 so as to cause operation of the keyboard 43 to make the desired contacts 58 and 59, the sheet will strike the roll 90 and will act to raise the same together with roll 91 so as to rock the lever arms 93 and 94 about their pivots 95 to make the contacts 96 and 97. When this is done, the circuit through the electromagnets 38 with which those contacts 58 and 59, which have been previously made are in series, will be completed so as to energize the same and upon energization of said magnet 38, the corresponding levers 31 will be rocked about their pivots to lower or move the cutters 34 into cutting position. After the sheet has been properly cut and as the glass passes out of contact with the roll 91, the said rolls 90 and 91 will, by their own weight, fall downwardly so as to disengage the contacts 96 and 97 to break the circuit through the energized magnets 38. When this occurs, those magnets 38 which were previously energized will be simultaneously de-energized so that all of the cutters which have been previously moved into cutting position will be simultaneously moved or returned to an inoperative or non-cutting position.

Figure 8:
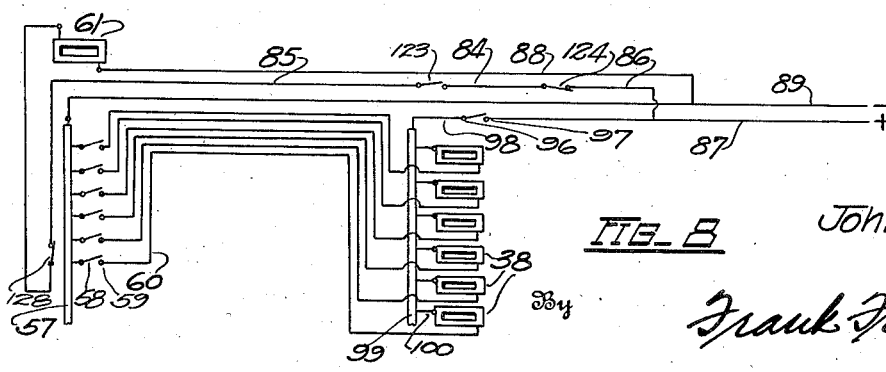
Fig. 8 is a diagrammatic view of the electrical wiring.

The operation of the invention may be more clearly understood in detail by referring to the electrical wiring diagram shown in Fig. 8. It is to be noted, in beginning, that in the keyboard control circuit, the switch 123 composed of the contacts 77, 78 and 79 is normally open while the switch 124 composed of the contacts 81, 82 and 83 is normally closed and that, in the cutter control circuit, the contacts 58 and 59 are normally broken as are also the contacts 96 and 97.

The sheet to be cut is first laid upon the receiving table 10 and the machine attendant, after inspecting the same, moves the desired key or keys 48 or 49 downwardly into operative position according to the cut or cuts to be made. The sheet is then passed to the cutters and as said sheet engages the roll 75, the switch 123 will be closed to complete the circuit through the magnet 61 whereupon the electrical current entering the positive main 87 will pass through the wire 86, switch 124, wire 84, switch 123 and wire 85 to the electromagnet 61 and will then pass outwardly thereof through the wire 88 to the negative main 89.

Upon completion of the keyboard control circuit, the magnet 61 will be energized so as to effect rotation of the keyboard 43 a quarter of a turn in the manner above described, whereupon those keys which have been previously moved into operative position will make their respective contacts 58 and 59 which are connected in series with the magnets 38 controlling the movement of those cutters to be used. As soon as the sheet strikes the roll 76, the switch 124 will be opened whereupon the circuit through the magnet will be broken and the keyboard actuating mechanism reset so as to be in position for again rotating the keyboard when the circuit is again closed.

Just after the sheet, engaging the roll 75 has effected rotation of the keyboard to make the desired contacts, the said sheet will engage the roll 90 to make the contacts 96 and 97 whereby to complete the circuit through the electromagnets 38 with which those contacts 58 and 59 which have been made, are in series. The electrical current will then enter through the positive main 87 and will pass through the contacts 96 and 97, bus bar 99 and wires 100 to the electromagnets 38 and will then pass outwardly thereof through the wires 60, through the contacts 59 and 58 and bus bar 57 to the negative main 89.

Upon energization of the magnets 38, the corresponding cutters will be rocked about their pivots and moved to a lowered or cutting position so that the sheet passing thereunder will be properly scored along the desired line or lines. After the sheet has been scored and the glass passes the roll 91, the said rolls 90 and 91 will be lowered to disengage contacts 96 and 97 so as to break the circuit through the magnets 38 and upon deenergization of said magnets, those cutters which have been previously moved to cutting position will be automatically and simultaneously returned to a non-cutting position.

After the cut has been completed and it is desired to cut a second sheet in a different manner, the keys then in a vertical position are pressed downwardly so that upon a quarter turn of the keyboard, these keys will make the desired contacts while those contacts made for the previous cut will be broken. According to the present invention, means is provided for automatically returning the keys to an inoperative position as they are moved to disengage the contacts. In other words, those keys which have been moved into operative position to make certain of the contacts for the cutting of one sheet are automatically returned to inoperative position upon rotation of the keyboard to make different contacts. This is accomplished by means of a knock-out or trip bar 126 (Fig. 2) provided with a bevelled face 127. Thus, those keys which are in operative position and engageable with certain of the contacts 58 will be moved inwardly to an inperative position as the finger pieces 51 thereof engage the bevelled face 127 of said trip bar upon further rotation of the keyboard.

However, while each successive sheet may be cut differently if desired, the same cut or cuts can be repeated if preferred without resetting of the keyboard to the end that a plurality of sheets may be cut in the same manner as an initial sheet. Should it be desired to repeat the cut, it is simply necessary to open the switch 128 (Fig. 1) interposed in the switchboard control circuit so that the circuit through the magnet 61 will be permanently broken and will not be closed upon engagement of the sheet with the roller 75. When the switch 128 is open, the keyboard will not be rotated but instead will remain stationary so that those contacts 58 and 59 moved to engage one another for the initial cut will not be broken upon movement of the subsequent sheets through the machine.

Thus, the desired contacts 58 and 59 are first made after which the switch 128 is opened. The next sheet then passed through the machine will, upon engagement with the roll 90 cause the making of the contacts 96 and 97 to effect movement of the desired cutters into cutting position and of course when the glass passes beyond the roll 91, these cutters will be automatically returned to a non-cutting position. However, when the sheet engages the roll 75 the circuit through the electromagnet 61 will not be completed to cause rotating of the keyboard since the switch 128 is open. Consequently, the next sheet and all succeeding sheets will be cut in the same manner until the switch 128 is closed, the same cutters being moved first into and then out of cutting position upon movement of each sheet through the machine. The keyboard may be manually rotated, if desired, by means of a hand wheel 129 (Fig. 4) mounted upon one end of the shaft 44.

Arranged along the forward edge of the receiving table 10 is a suitably graduated strip 130 to indicate the number of the keys or the number of inches any one pair of keys may be from the edge of the table, the numbering of the keys of the keyboard in this manner greatly facilitating the moving of the desired cutter or cutters into cutting position according to the manner in which the sheet is to be cut. In order to facilitate the placing of the glass upon the receiving table 10, a plurality of relatively large rollers 131 carried by shaft 132 may be arranged along the forward end thereof and which rollers further serve to protect the keyboard from the sheet as the former is placed upon said receiving table.

The present invention further proposes the provision of improved means whereby the sheet laid upon the top of the receiving table 10 may be easily and quickly passed to the cutters. To this end, there is arranged beneath the receiving table, a frame 101 (Fig. 2) consisting of a plurality of longitudinally extending pairs of spaced members 102, each pair of members being pivotally mounted as at 103 to the framework of the receiving table and all of said pair of members being connected at their forward ends by a common cross member 104 (Fig. 1). Rotatably mounted between and carried by each pair of spaced members 102 are a plurality of rolls 105 adapted, when frame 101 is raised, to project upwardly through openings 106 in the table top 12.

Secured to the extensions 46 and 47 of the receiving table 10 are plates 107 (Fig. 2) within which is mounted a transverse shaft 108. Carried by this shaft is a rockable lever 109 connected with the frame 101 by a link 110 and to a treadle 111 by means of a rod 112, said treadle being pivotally mounted at one end as at 113 and being adapted upon movement thereof to cause the raising and lowering of the frame 101.

The auxiliary frame 101 is normally maintained in a lowered position by means of its own weight so that the rollers 105 thereof will not project upwardly through the openings 106 and when in such position, the treadle will be elevated to its dotted line position shown in Fig. 2. After the sheet to be cut has been placed upon the receiving table and properly inspected, the treadle is pressed downwardly by the operator whereupon the lever 109 rocking about its pivot 108 will effect raising of the frame 101. When this is done, the rolls 105 passing upwardly through the openings 106 in the table top 12 will raise the sheet therefrom to an inclined position so that the same will be caused to slide onto the cutting table. When the rollers are raised, the sheet contacting surfaces thereof will be arranged in an inclined plane slanting downwardly toward the cutting table. A locking plate 115 pivoted at 116 may also be provided for locking the treadle in its downward position and the rollers 105 in their raised position if desired, said plate being provided with a notch 117 within which is adapted to fit the part 118 of said treadle, the locking plate being yieldably held by means of a spring 119.

The present invention further includes means whereby the sheet being cut will be normally urged toward one side of the machine and guided therethrough so that there will be no danger of said sheet passing through the machine in a crooked position. To accomplish this, the several rolls constituting the cutting table are arranged diagonally thereof as clearly shown in Fig. 9 so that as the sheet is carried through the machine it will be continually urged to one side thereof. A guide member 120 extends longitudinally along this side of the machine and carries a plurality of rollers 121 against which the sheet edge contacts.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In glass cutting apparatus, means for supporting a glass sheet to be cut, a plurality of cutters associated with said supporting means and beneath which the sheet is adapted to be passed, and means engageable by the sheet as it is passed beneath the cutters for effecting movement of the cutters into and out of cutting engagement with said sheet.

2. In glass cutting apparatus, means for supporting a glass sheet to be cut, a plurality of cutters associated with said supporting means and beneath which the sheet is adapted to be passed, means engageable by the sheet as it is passed beneath the cutters to effect movement of the cutters into cutting engagement with said sheet, and means for automatically returning the cutters to a non-cutting position out of engagement with the sheet upon the release of said last named means by said sheet.

3. In glass cutting apparatus, means for supporting a glass sheet to be cut, a plurality of cutters associated with said supporting means, magnetic means for controlling the movement of said cutters into and out of cutting engagement with the sheet, and means engageable by the sheet as it is passed in proximity to the cutters for effecting operation of said magnetic means to move said cutters into cutting engagement with said sheet.

4. In glass cutting apparatus, means for supporting a glass sheet to be cut, a plurality of cutters associated with said supporting means, individual magnetic means for independently controlling the movement of said cutters, means engageable by the sheet as it is passed through the apparatus for operating said cutter controlling means to cause movement of the cutters into cutting engagement with the sheet, and means for automatically returning the cutters to a non-cutting position out of engagement with said sheet upon the release of said last named means by said sheet.

5. In glass cutting apparatus, means for supporting a glass sheet to be cut, a plurality of cutters associated with said supporting means, an electrical circuit including a plurality of magnets for controlling said cutters, and means engageable by the sheet as it passed beneath the cutters for opening and closing the circuit through said magnets to control the movement of said cutters into and out of cutting position.

6. In glass cutting apparatus, means for supporting a glass sheet to be cut, a plurality of cutters associated with said supporting means, an electrical circuit including a plurality of individual magnets for independently controlling said cutters, means engageable by the sheet as it passed in proximity to the cutters for closing the circuit through said magnets to effect movement of the cutters into cutting position, said circuit being automatically broken upon continued movement of the sheet, and means for automatically returning the cutters to and maintaining them in a non-cutting position upon the release of the circuit closing means by said sheet.

7. In glass cutting apparatus, means for supporting a glass sheet to be cut, a plurality of cutters associated with said supporting means, an electrical circuit including a plurality of magnets for controlling said cutters, contacts in the circuit, means operable by the sheet as it moves through the apparatus for making said contacts, and means also operable by the sheet upon continued movement thereof for breaking the circuit through said magnets to control the movement of said cutters.

8. In glass cutting apparatus, means for supporting a glass sheet to be cut, a plurality of cutters associated with said supporting means, an electrical circuit including a plurality of magnets for controlling said cutters, contacts in the circuit, means operable by the sheet as it moves through the apparatus for making said contacts, and means engageable by the sheet upon continued movement thereof for closing the circuit through said magnets subsequent to the making of said contacts so as to effect movement of the cutters into cutting position.

9. In glass cutting apparatus, means for supporting a glass sheet to be cut, a plurality of cutters associated with said supporting means, means for effecting movement of the cutters into and out of cutting position, and means including a rotatable keyboard adapted upon rotation thereof to control the operation of said last named means whereby to effect movement of the cutters into cutting position.

10. In glass cutting apparatus, means for supporting a glass sheet to be cut, a plurality of cutters associated with said supporting means, means for effecting movement of the cutters into and out of cutting position, a rotatable keyboard having a plurality of keys for each cutter, connections between the rotatable keyboard and said last mentioned means, and magnetic means operable by the sheet upon movement thereof through the apparatus for effecting the rotation of said keyboard to effect the operation of said cutter operating means to cause the movement of the cutters into cutting position.

11. In a glass cutting apparatus, means for supporting a glass sheet to be cut, a plurality of cutters associated with said supporting means, means for effecting movement of the cutters into and out of cutting position, including an electro-magnet for each cutter and contacts connected in series therewith, a rotatable keyboard, and means engageable by the sheet as it is moved through the apparatus for effecting rotation of said keyboard to make said contacts whereby to close the circuit through the electro-magnets and cause movement of the cutters into cutting position.

12. In glass cutting apparatus, means for supporting a glass sheet to be cut, a plurality of cutters associated with said supporting means, an electrical circuit including a plurality of magnets for controlling said cutters, contacts in the circuit which are normally broken, a rotatable keyboard having a plurality of keys corresponding with the cutters, means operable by the sheet as it is passed beneath the cutters for effecting rotation of said keyboard to make said contacts, and means also operable by the sheet upon continued movement thereof for completing the circuit through said magnets and contacts to effect movement of said cutters into cutting position.

13. In glass cutting apparatus, means for supporting a glass sheet to be cut, a plurality of cutters associated with said supporting means, an electrical circuit including a plurality of magnets for controlling the movement of said cutters into and out of cutting position, contacts in said circuit, an operable keyboard, a keyboard control circuit for operating said keyboard to make said contacts, and means for completing the circuit through the contacts and magnets to effect energization of said magnets to cause movement of the cutters into cutting position.

14. In glass cutting apparatus, means for supporting a glass sheet to be cut, a plurality of cutters associated with said supporting means, an electrical circuit including a plurality of magnets for controlling said cutters, contacts in the circuit, a movable keyboard, a keyboard control circuit, means engageable by the sheet as it is moved through the apparatus for closing said second circuit to effect operation of said keyboard to make the contacts in said magnetic circuit, and means also engageable by the sheet upon continued movement thereof for subsequently closing the electrical circuit through the contacts and magnets to cause the energization of said magnets whereby to effect movement of said cutters into cutting position.

15. In sheet glass cutting apparatus, a cutting table, a plurality of cutters associated with said table, a receiving table upon which the sheet to be cut is laid, and means for raising the sheet from said receiving table into an inclined plane and causing it to slide onto said cutting table.

16. In sheet glass cutting apparatus, a cutting table, a plurality of cutters associated with said table, a receiving table upon which the sheet to be cut is laid, a plurality of rollers pivotally mounted beneath said table, and means for raising said rollers so that they will project upwardly beyond the top of said table so as to raise the sheet therefrom and cause it to slide onto the cutting table, the sheet contacting surfaces of said rollers being arranged in an inclined plane slanting downwardly toward the cutting table.

Signed at Toledo, in the county of Lucas and State of Ohio, this 24th day of August 1927.

JOHN L. DRAKE.